United States Patent [19]

Drake

[11] Patent Number: 5,112,791

[45] Date of Patent: May 12, 1992

[54] DIMERIZATION PROCESS AND CATALYSTS THEREFOR

[75] Inventor: Charles A. Drake, Nowata, Okla.

[73] Assignee: Phillips Petroleum Company, Bartlesville, Okla.

[21] Appl. No.: 572,735

[22] Filed: Aug. 27, 1990

[51] Int. Cl.$^5$ .................. B01J 21/14; B01J 23/04
[52] U.S. Cl. .................. 502/243; 502/244; 502/260
[58] Field of Search ............ 502/243, 238, 260, 244

[56] References Cited

U.S. PATENT DOCUMENTS

| | | | |
|---|---|---|---|
| 2,887,472 | 5/1959 | Fotis, Jr. | 502/243 |
| 3,145,196 | 8/1964 | Engel | 502/243 |
| 3,175,020 | 3/1965 | Wilkes | 260/683.5 |
| 3,175,021 | 3/1965 | Vanselow et al. | 260/683.15 |
| 3,198,748 | 8/1965 | Summit et al. | 252/443 |
| 3,432,572 | 3/1969 | Tazuma et al. | 502/243 |
| 4,388,480 | 6/1983 | Imai et al. | 585/516 |
| 4,609,637 | 9/1986 | Drake | 502/174 |
| 4,656,154 | 4/1987 | Drake | 502/185 |
| 4,661,466 | 4/1987 | Drake et al. | 502/184 |
| 4,810,688 | 3/1989 | Ewert et al. | 502/174 |

OTHER PUBLICATIONS

Denstone® Inert Catalyst Bed Supports (Norton Chemical Process Products Products Bulletin, Nov. 1988)–sales brochure for Denstone® 57 & Denstone® 99 products.

Chemical Catalytic Products (Norton Chemical Process Products Bulletin, Oct. 1981)–sales brochure for ceramic-based catalyst carriers, i.e. SA5123.

*Primary Examiner*—Carl F. Dees
*Attorney, Agent, or Firm*—Lynda S. Jolly

[57] ABSTRACT

Catalyst supports, catalyst systems, methods for the preparation thereof, in dimerization processes therewith are provided. Catalyst supports are prepared from alkali metal carbonate, at least one low surface area silica-alumina, and a liquid. Catalyst systems comprised of at least one elemental alkali metal deposited on the catalyst support. Optionally, the catalyst system further comprises of at least one promoter.

18 Claims, No Drawings

DIMERIZATION PROCESS AND CATALYSTS THEREFOR

BACKGROUND OF THE INVENTION

This invention relates to alkali metal carbonate supported alkali metal catalysts.

It is known in the art to employ alkali metal carbonate supported elemental alkali metal catalysts for such conversions as propylene dimerization. Several catalyst compositions, as well as methods of preparing these types of catalysts, are known in the art. The resultant catalyst systems, although useful to dimerize olefins, do not always have a high conversion rate and/or a high isomer ratio of desired product(s) to undesired product(s). Thus, a dimerization process, because of low conversion and/or low isomer ratio, can be more time consuming and require larger, more uneconomical, reactor equipment.

SUMMARY OF THE INVENTION

It is an object of this invention to provide an improved catalyst support for a catalyst system useful for the dimerization of olefins.

It is an object of this invention to provide an improved catalyst system for the dimerization of olefins.

It is another object of this invention to provide a method to prepare an improved alkali metal carbonate supported elemental alkali metal catalyst system, by the addition of at least one low surface area silica-alumina to the support.

It is yet another object of this invention to provide a process to improve catalyst activity and/or the isomer ratio of desired product(s) to undesired product(s) of an alkali metal carbonate supported elemental alkali metal catalyst system.

It is yet another object of this invention to provide an improved process for the dimerization of olefins.

It is yet another object of this invention to provide an improved process to prepare a catalyst support.

In accordance with one embodiment of this invention, a catalyst support which comprises an alkali metal carbonate and at least one low surface area silica-alumina compound is provided.

In accordance with another embodiment of this invention, a dimerization catalyst system comprising at least one elemental alkali metal supported on a support which comprises an alkali metal carbonate and a low surface area silica-alumina is provided. This dimerization catalyst system is useful to dimerize olefins and results in an improved isomer ratio of desired product(s) to undesired product(s) and/or an improved olefin conversion rate.

DESCRIPTION OF THE PREFERRED EMBODIMENTS

The present invention provides a process to prepare a catalyst support which comprises the steps of preparing a thick paste comprising an alkali metal carbonate, low surface area silica-alumina, liquid and optionally a carbonaceous compound or finely divided stainless steel; forming a particulate product from said paste; and calcining said particulate product. The particulate product can be formed by grinding and sieving prior to calcining, or it can be formed into an extrudate, pellets, tablets, pills, and/or any other granular form prior to calcining. After calcination, the particulate product is contacted with at least one elemental alkali metal to produce a catalyst composition.

Supports

As used in this disclosure, the term "support" refers to a carrier for another catalytic component. However, by no means, is the support necessarily an inert material; it is possible that the support can contribute to catalytic activity and selectivity.

The catalyst support can be formed by any method known in the art. Thus, commercially available alkali metal carbonate in the form of powder, pellets, granules, or any other form can be treated directly after combining with low surface area silica-alumina, with at least one elemental alkali metal and, optionally, one or more of the desired promoting materials as discussed more fully below. This form of support has the advantage of being most readily obtained with a minimum of handling.

The low surface area silica-alumina can be either porous or vitreous in form. Porous, low surface area silica-alumina is usually used as a catalyst carrier and usually is considered not inert. The alumina present in the porous, low surface area silica-alumina compound is in the alpha-alumina phase. The porosity of the compound is about from 34 to about 41 percent by volume. Low surface area silica-aluminas generally include those having a surface area within the range of about 0.001 to about 50 $m^2/g$. Preferably the surface area is less than about 10 $m^2/g$ and most preferably, the low surface area less than about 5.0 $m^2/gm$. Total pore volume of a suitable low surface area silica-alumina will be within the range of from about 0.01 to about 1.00 cc/g. Preferably the pore volume will be less than about 0.8 cc/g and most preferably, the low surface area silica-alumina will have a pore volume of less than about 0.7 cc/gm. Physical characteristics within these ranges can result in a catalyst support that improves percent conversion from reactant(s) to product(s). One example of porous, low surface area silica-alumina is SA5123, available from Norton Chemical Process Products, which has a surface area of about 0.02 $m^2/g$, a pore volume within the range of about 0.13 to about 0.26 cc/g, and a porosity within the range of about 34 to 41 percent by volume.

Vitreous silica-alumina is a silica-alumina that has been heated until substantially all of the pores of the composition have been fused. The porosity is very low, i.e. usually less than about two percent by volume. The vitrified product is chemically inert due to vitrification, has good durability and high crush strength. It can be used as an inert bed support for catalysts or other materials. Vitreous, or non-porous, silica-aluminas generally include those having a surface area within the range of about 0.001 to about 1 $m^2/g$. Preferably, the surface area is less than about 0.5 $m^2/g$ and most preferably, less than about 0.1 $m^2/g$. Suitable vitreous silica-aluminas have a pore volume within the range of about 0.001 to about 1 cc/g. Preferably, the pore volume is less than about 0.1 cc/g. Physical properties of vitreous silica-aluminas within these ranges can improve reactant conversion, product selectivity to the desired product(s), and/or the product ratio of desired isomer(s) to undesired isomer(s). One example of vitreous silica-alumina are Denstone products, available from Norton Chemical Process Products, such as for example, Denstone 57. Denstone 57 has a porosity of about 1.5%, surface area of about 0.01 m²/g, and a pore volume of about 0.01 cc/g.

The amount of porous, low surface area silica-alumina in the support, expressed as weight percent based on the total weight of the final support, generally comprises a range of from about 1 to about 40 weight percent. Preferably, the support comprises from about 5 to about 30 weight percent, and most preferably the composition comprises from about 10 to about 25 weight percent porous, low surface area silica-alumina based on the weight of the final support, in order to maximize percent conversion of reactant(s) to dimerized product(s).

The amount of vitreous, low surface area silica-alumina in the support expressed as weight percent based on the total weight of the final support, generally comprises a range of from about 1 to about 20 weight percent. Preferably, the support comprises from about 3 to about 15 weight percent and most preferably the composition comprises from about 5 to about 12 weight percent vitreous, low surface area silica-alumina based on the weight of the calcined support, to achieve high percent conversion, high selectivity, and a high 4MP1/4MP2 ratio.

Exemplary alkali metal carbonates include carbonates of lithium, sodium, potassium, rubidium, cesium, and mixtures thereof. Potassium carbonate is the most preferred alkali metal carbonate due to ease of use and good compatibility with the preferred elemental alkali metal.

In some circumstances, a large particle size and/or more rugged form of catalyst support is desired, such as, for example, where fixed bed reactions, especially large volume fixed bed reactions, are carried out. One particular technique for support preparation is to form a thick paste comprising an alkali metal carbonate, a low surface area silica-alumina, and a liquid. The liquid can be water or mixtures of water and alcohols or water soluble ketones. In most cases the thick paste can be extruded, pelletized, pilled, or tabletted into desired sizes. The resultant material is then oven dried under conditions of time and temperature such that substantially all liquid is driven off. These types of supports will be referred to as "wet process" alkali metal carbonate supports.

The wet process using alcohol and water as liquid is described in Ewert et al, U.S. Pat. No. 4,810,688, herein incorporated by reference. Alcohols suitable for use in preparation of "wet process" catalyst supports are straight chain and branched aliphatic alcohols having from about 1 to about 7 carbon atoms. The wet process describing water soluble ketone and water is disclosed in Drake U.S. Pat. No. 4,895,819, herein incorporated by reference. Water soluble ketones suitable for use in preparation of "wet process" catalyst supports are straight chain and branhces water soluble ketones having from about 3 to about 7 carbon atoms.

In accordance with another technique for the support preparation, an alkali metal.carbonate is pelletized with at least one carbonaceous compound. The pelleted support, either as pellets or as smaller crushed particles, is then heated in an oxygen-containing atmosphere under conditions suitable to oxidize in the range of about 10 to about 90 weight percent of the carbonaceous compound. As a result of this partial oxidation of the peleted support, the concentration of carbonaceous compound remaining on the surface of the support is substantially less than the concentration of carbonaceous compound remaining on the interior portions of the support. Catalyst support prepared in this manner will be referred to as "carbon containing" alkali metal carbonate support.

The term "carbonaceous compound" is intended to include various forms of the elemental carbon. Examples include, but are not limited to, carbon black, charcoal, coconut charcoal, amorphous graphite, and crystallite graphite.

Once the catalyst support is formed according to any method known in the art, the support must be calcined in an oxygen-containing atmosphere at a temperature within the range of about 50° to about 275° C., preferably from about 100° to about 275° C., and most preferably from about 150° to about 275° C. for a time of at least 2 hours. The temperature must be high enough to drive off water from the surface as well from the pores. The maximum temperature is determined to be appropriate for the careful oxidation of the carbonaceous compound. Times in excess of about 20 hours generally impart no additional beneficial affect. Thus, times in the range of about 2 to about 20 hours are useful. Upon completion of calcination, the catalyst support can be stored in a dry atmosphere. Preferably, the catalyst support is stored under a dry, oxygen-free atmosphere until needed for further treatment.

Catalysts and Promoters

Catalyst systems employed in the practice of this invention comprise one of the catalyst supports described above, at least one elemental alkali metal catalyst, and optionally one or more promoters. It should be recognized, however, that the catalyst systems of the invention can contain additional components which do not adversely affect the catalyst performance, such as, for example, pigments, dyes, processing aids, inert fillers, binders and the like.

The alkali metals contemplated to be within the scope of the invention include lithium, sodium, potassium, rubidium, and cesium. While the proportion of alkali metal combined with the catalyst support can vary appreciably, generally at least about one weight percent of alkali metal based on the total weight of treated support will be employed. Generally, about 1 to about 20 weight percent alkali metal will be employed with about 2 to about 15 weight percent preferred. An alkali metal loading of about 3 to about 10 weight percent based on the total weight of treated support is most preferred for most efficient use of reagents, high catalyst activity and selectivity, high isomer ratio, and ease of catalyst preparation. Potassium is the preferred elemental alkali metal due to its ready availability as well as excellent compatibility with the inventive catalyst support.

The promoters contemplated to be within the scope of the invention include elemental copper, elemental cobalt, finely divided stainless steel, finely divided glass, and mixtures of two or more thereof. The proportion of optional promoter on the alkali metal carbonate support can vary appreciably, but generally, at least one weight percent of the optional promoter based on the total weight of treated support will be employed. The following amounts are provided for additional guidance:

| Promoter | Loading, Weight Percent | | |
|---|---|---|---|
| | Broad | Intermediate | Preferred |
| Cu | 1–30 | 3–20 | 5–12 |

-continued

| Promoter | Loading, Weight Percent | | |
|---|---|---|---|
| | Broad | Intermediate | Preferred |
| Co | 1-50 | 3-25 | 5-15 |
| *SS | 1-80 | 3-60 | 5-50 |
| Glass | 1-50 | 2-25 | 3-15 |

*SS = Stainless Steel

The general procedure for preparation of the catalyst systems of the invention, after calcining the support, involves heating the catalyst support to a temperature in the range of about 80° to about 350° C., preferably slightly above the melting point of the particular alkali metal used, and then contacting the catalyst support with at least one elemental alkali metal in a dry, oxygen-free atmosphere, such as, for example $N_2$, Ar, or the like. The contacting, done in an oxygen-free atmosphere, is preferably carried out with suitable mixing to ensure even distribution. Suitable temperatures for the contacting step will vary with the particular alkali metal employed. For example, with elemental potassium, temperature in the range of about 80° to 100° C. are preferred, while with elemental sodium, temperatures in the range of about 100° to 140° C. are preferred.

While the catalyst support is maintained at or above the melting point of the particular alkali metal used, in an oxygen-free atmosphere, any desired promoter(s), such as, for example, finely divided stainless steel or elemental copper, can be gradually added while the treated catalyst is continually stirred. For example, with potassium, temperatures in the range of about 80° to about 100° C. are employed. The catalyst system is then ready to be charged to the reactor.

Optionally, the catalyst support, once elemental alkali metal and any desired promoters have been deposited thereon, can be subjected to a subsequent heating step, in an oxygen-free atmosphere, to ensure as uniform a distribution as possible of the various promoters on the surface of the alkali metal carbonate support. Thus, the finished catalyst can be subjected to a temperature in the range of about 80° C. to about 350° C. for a time in the range of about 0.1 to about 4 hours. A temperature in the range of about 150° to about 250° C. for a time in the range of about 0.5 to about 2 hours is presently preferred for the most uniform distribution.

Optionally, prior to charging the reactor, the catalyst system can be mixed with an inert substance to dilute the catalyst system and decrease the rate of olefin dimerization. Any inert substance which has no catalytic activity in an olefin dimerization reaction can be used. One example of such an inert substance is glass beads.

As indicated by the variety of supports, alkali metal components, and promoters included within the scope of the invention, numerous catalyst combinations are possible. Any combination of the alkali metal and optional promoters disclosed can be supported on any alkali metal carbonate support disclosed. Some possible combinations are described in detail in the examples which follow. The combination of support, alkali metal and promoter(s) which one may choose to employ will depend on a variety of variables such as for example, reactor configuration, reaction temperature and pressure, olefin feed employed, rate of olefin feed, and conversions desired.

Reactants

Reactants applicable for use in the process of the invention are olefinic compounds which can (a) self-react, i.e., dimerized, to give useful products such as, for example, the self-reaction of propylene gives 4-methyl-1-pentene; and/or (b) olefinic compounds which can react with other olefinic compounds, i.e., co-dimerize, to give useful products such as, for example, co-dimerization of ethylene plus propylene gives 1-pentene, co-dimerization of ethylene and 1-butene gives 3-methyl-1-pentene and so forth. As used herein, the term "dimerization" is intended to include both self-reaction and "co-dimerization" as defined above.

Suitable dimerizable olefinic compounds are those compounds having from about 3 to about 30 carbon atoms and having at least one olefinic double bond and at least one allylic hydrogen atom, i.e., at least one hydrogen atom attached to a carbon atom adjacent to a double-bonded carbon atom. Exemplary compounds include, but are not limited to, acyclic and cyclic olefins such as, for example, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes and so forth; 3-methyl-1-butene, 2-methyl-2-butene, 3-methyl-1-pentene, 3-methyl-2-pentene, 4-methyl-1-pentene, 4-methyl-2-pentene, tetramethylethylene and the like; cyclopentene, cyclohexene, methylcyclopentene, methylcyclohexene, and the like and mixtures of any two or more thereof.

Suitable co-dimerizable olefinic compounds are those compounds having from about 2 to about 30 carbon atoms, including all the compounds contemplated within the scope of "dimerizable" olefinic compounds as indicated above. In addition, olefinic compounds which do not have at least one allylic hydrogen atom are also included within the scope of co-dimerizable olefins. Exemplary compounds in addition to those indicated above, include, but are not limited to ethylene, 3,3-dimethyl-1-butene, ditertiarybutyl ethylene and the like and mixtures of any two or more thereof.

The compounds indicated above as dimerizable olefinic compounds are capable of undergoing both self-reaction, i.e., dimerization, and cross-reaction, i.e., co-dimerization, with other members of the same group or with those compounds designated as co-dimerizable. The co-dimerizable compounds which do not have at least one allylic hydrogen may be capable of isomerization to form an olefin having an allylic hydrogen under the reaction conditions employed. If such isomerization is not possible, then those non-isomerizable, co-dimerizable compounds which do not have at least one allylic hydrogen must be contacted with at least one of the "dimerizable" compounds in order to facilitate the desired co-dimerization reaction. In other words, the co-dimerizable compounds which do not have at least one allylic hydrogen atom and are not capable of isomerization to produce an olefin having at least one allylic hydrogen are therefore not capable of reacting with themselves under the reaction conditions employed for the dimerization reaction.

Reaction Conditions

The dimerization reaction of the invention can be carried out using either batch or continuous types of operation, although the catalysts of the invention are particularly well suited for continuous, fixed bed, operation. Suitable equipment, such as, for example, autoclaves, tubular reactors and the like as are well known in the art can be employed. No special materials of construction are required so that steel, stainless steel, glass-lined reactors, or the like can be employed.

The reaction temperature can vary depending on the catalyst and feed(s) employed. Typically, a temperature range of about 50° to about 250° C. is suitable. Temperatures of about 80° to about 200° C. are preferred with a range of about 120° to about 170° C. most preferred because optimum reaction rates are obtained with minimum by-product formation.

The dimerization reaction can be carried out by contacting the dimerizable olefins with catalyst in the liquid phase or the gas phase, depending on the structure and molecular weight of the olefin, as well as reaction temperature and pressure employed. Pressure during the dimerization reaction can vary between wide limits. In general, higher pressures favor the progress of the reaction. Thus, pressures of atmospheric up to about 10,000 psig and higher are suitable. Preferably, pressures of about 100 to about 5,000 psig are employed, with pressures of about 1,000 to about 4,000 psig most preferred in order to achieve a good balance between reaction rate and minimize equipment and operating costs necessitated by very high reaction pressures.

If the reaction is carried out in the liquid phase, solvents or diluents for the reactants can be used. Saturated aliphatic hydrocarbons, e.g., pentane, hexane, cyclohexane, dodecane; aromatic compounds, preferably those without an alpha-hydrogen (which would be capable of undergoing alkylation under the reaction conditions) such as benzene and chlorobenzene are suitable. If the reaction is carried out in the gaseous phase, diluents such as aliphatic hydrocarbons, for example methane, ethane and/or substantially inert gases, e.g., nitrogen, argon, can be present.

The contact time required for the dimerization reaction depends upon several factors, such as, for example, the activity of the catalyst, temperature, pressure, structure of the reactants employed, level of conversion desired, and the like. The length of time during which the dimerizable olefinic compounds are contacted with catalyst can vary conveniently between about 0.1 seconds and about 24 hours although shorter and longer contact times can be employed. Preferably, times of about one minute to about 5 hours are employed. Where reaction is carried out in continuous fashion, it is convenient to express the reactant/catalyst contact time in terms of weight hourly space velocity (WHSV), i.e., the ratio of the weight of reactant which comes in contact with a given weight of catalyst per unit time. Thus, a WHSV of about 0.1 to about 10 will be employed. A WHSV of about 0.5 to about 5 is preferred, with about 1 to about 4 WHSV most preferred for optimum catalyst productivity.

Products

The olefinic products of the invention have established utility in a wide variety of applications, such as, for example, as monomers for use in the preparation of homopolymers, copolymers, terpolymers, e.g., as the third component of ethylene-propylene terpolymers useful as synthetic elastomers, and the like.

A further understanding of the present invention and its advantages will be provided by reference to the following examples.

EXAMPLES

In each of the following examples, typically, the dimerization of propylene was carried out in a steam heated 316 stainless steel tubular reactor ($\frac{1}{2}'' \times 20''$). The catalyst system (27 grams; density about 0.84 g/mL), bounded above and below by small volumes of glass beads, was combined with 25 grams of an inert substance, i.e., no dimerization catalytic activity, to dilute the catalyst system and thus reduce and control the reaction rate. The contents of the tubular reactor were heated to the reaction temperature of about 160° C. at about 1500 psig and propylene was pumped into the reactor at a rate of about 120 mL/hr. After about 1.5 hours of reaction time and each one hour thereafter for the following 6 hours, a sample was collected and analyzed by gas liquid chromatograph (GLC). The summarized results represent the analysis of the last dimerization sample collected.

The catalyst support was prepared from varying amounts of commercially available anhydrous potassium carbonate (JT Baker, ACS reagent grade), a low surface area silica-alumina, and deionized water. Sufficient water was added to the solid particles to form a thick paste. Usually, about 2 milliliters of water were added to about 1 gram of solid material. The thick paste was thoroughly mixed and then dried at about 85° C. in a vacuum oven for at least two hours in the presence of air. The dried paste was ground to about six mesh and calcined at about 250° C. for about 3 hours in an oxygen-containing atmosphere.

The resultant support was allowed to cool and maintained at a temperature of about 85° C., in an oxygen-free atmosphere, at which time about 5 weight percent of elemental potassium based on weight of final calcined support was added. The catalyst support and catalyst system were kept under a dry, inert atmosphere during and after preparation.

Catalysts and the results of the corresponding propylene dimerizations are summarized in Tables I and II. Percent propylene conversion, as used in Tables I and II, is the weight percent of reactant propylene that was converted to any type of reaction product. Percent selectivity, is the weight percent of product that was 4-methyl-1-pentene (4MP1). The isomer ratio, 4-methyl-1-pentene/4-methyl-2-pentene (4MP1/4MP2), is the mass ratio of 4MP1 to 4MP2 in the final product. The isomer ratio data is significant because 4MP1, the desired product, and 4MP2, the undesired product, are difficult to separate.

EXAMPLE I

The low surface area silica-alumina used in Example I is of the porous type and is commercially available as product number SA5123, supplied by Norton Chemical Process Products. The physical properties of SA5123 are as follows: surface area 0.02–0.06 m$^2$/g, pore volume 0.13–0.26 cc/gm, bulk (particle) density of 2.1–2.4 gm/cc, packing density 1200–1360 kg/m$^3$, and pore size distribution of 10% greater than 200μ, 30% greater than 27μ, 50% greater than 15μ, 70% greater than 10μ, and 90% greater than 5μ. The chemical composition in weight percent is 87% Al$_2$O$_3$; 11% SiO$_2$; 0.4% Na$_2$O; 0.5% Fe$_2$O$_3$; 0.3% TiO$_2$; 0.1% CaO; 0.2% MgO; and 0.2% K$_2$O.

In all Runs, the catalyst used was about 5 weight percent elemental potassium based on the weight of the final calcined support.

TABLE I

| Run No. | Support | Catalyst | Conversion, % | Selectivity, % | 4MP1/4MP2 |
|---|---|---|---|---|---|
| 101 | $K_2CO_3$ + 20% SA5123* | 5% K | 28.2 | 86.5 | 15 |
| 102 | $K_2CO_3$ + 40% SA5123* | 5% K | 23.5 | 82.8 | 9 |
| 103 | $K_2CO_3$ no SA5123 | 5% K | 21.9 | 88.0 | 19 |

*% by weight, based on weight of potassium carbonate used

The data in Table I show that the best propylene dimerization catalyst based on high levels of percent conversion, is that in Run 101, although other formualtions are effective propylene dimerization catalysts. Run 103, where a low surface area silica-alumina is absent from the catalyst support, demonstrates lower percent conversion.

EXAMPLE II

The low surface silica-alumina used in Example II is vitrified, non-porous type and is commercially available as Denstone 57, supplied by Norton Chemical Process Products. Denstone 57 has a surface area of about 0.011 to about 0.016 $m^2/gm$, free space of 40%, particle density 2.4 gm/cc, Moh's hardness 6.5, modulus of rupture ASTM C-133 of 8,000 psi, linear expansion coefficient $9.5 \times 10^{-6}$ m/m° C., and specific heat at 100° C. of 0.25 cal/gm. The chemical composition in weight percent is 38% $Al_2O_3$; 56% $SiO_2$; 1.9% $Fe_2O_3 + TiO_2$; 1.7% MgO and CaO; and 1.9% $Na_2O$ and $K_2O$.

In all Runs, the catalyst used was about 5 weight percent elemental potassium based on the weight of the final calcined support.

TABLE II

| Run No. | Support | Catalyst | Conversion, % | Selectivity, % | 4MP1/4MP2 |
|---|---|---|---|---|---|
| 201 | $K_2CO_3$ + 10% Denstone 57* | 5% K | 24.1 | 88.0 | 20 |
| 202 | $K_2CO_3$ + 20% Denstone 57* | 5% K | 18.8 | 86.8 | 17 |
| 203 | $K_2CO_3$ no Denstone 57 | 5% K | 21.9 | 88.0 | 19 |

*% by weight, based on weight of potassium carbonate used

The data in Table II show that the best overall propylene dimerization catalyst is that in Run 201, based on high levels of percent conversion, selectivity, and isomer ratio, although other formulations are effective propylene dimerization catalysts.

These examples have been provided merely to illustrate the practice of the invention and should not be read so as to limit the scope of the invention or the appended claims in any way. Reasonable variations and modifications, not departing from the essence and spirit of the invention, are contemplated to be within the scope of patent protection desired and sought.

That which is claimed is:

1. A composition comprising:
   a) at least one elemental alkali metal; and
   b) a support comprising alkali metal carbonate and at least one low surface area silica-alumina compound;
   wherein component (a) is supported on component (b).

2. A composition according to claim 1 wherein said elemental alkali metal is potassium.

3. A composition according to claim 1 wherein said elemental alkali metal is present in an amount within the range of from about 1 to about 20 weight percent, based on the total weight of said support.

4. A composition according to claim 1 wherein said alkali metal carbonate is potassium carbonate.

5. A composition according to claim 1 wherein said low surface area silica-alumina compound is selected from the group consisting of porous silica-alumina and vitrified silica alumina having a surface area in the range of from about 0.001 to 50.0 about $m^2/gm$ and a pore volume in the range of from about 0.01 to about 1.0 cc/gm.

6. A composition according to claim 5 wherein said porous low surface area silica-alumina compound is present in an amount within the range of from about 1 to about 40 weight percent based on total weight of the support.

7. A composition according to claim 5 wherein said vitreous low surface area silica-alumina compound is present in an amount within the range of from about 1 to about 20 weight percent based on total weight of the support.

8. A composition comprising:
   a) a catalyst support comprising potassium carbonate and a porous low surface area silica-alumina, wherein potassium carbonate is present in an amount within the range of from about 60 to about 99 weight percent and the porous low surface area silica-alumina compound is present in an amount within the range of from about 1 to about 40 weight percent based on total weight of the support, wherein said support is calcined from about 100° C. to about 400° C.; and
   b) elemental potassium within the range of from about 1 to about 20 weight percent of said catalyst support.

9. A composition comprising:
   a) a catalyst support comprising potassium carbonate and a vitreous low surface area silica-alumina, wherein potassium carbonate is present in an amount within the range of from about 80 to about 99 weight percent and the vitreous low surface area silica-alumina compound is present in an amount within the range of from about 1 to about 20 weight percent based on total weight of the support wherein said support is calcined from about 100° C. to about 400° C.; and
   b) an elemental alkali metal within the range of from about 1 to about 20 weight percent of said catalyst support.

10. A process for the preparation of a catalyst support comprising:
   a) preparing a thick paste comprising an alkali metal carbonate, a low surface area silica-alumina compound, and a liquid;
   b) forming a particulate product from said paste; and
   c) calcining said particulate product.

11. A process for producing a catalyst system which comprises contacting a support prepared in accordance with claim 9 with at least one elemental alkali metal.

12. A process according to claim 11 wherein said contacting is under an oxygen-free atmosphere and at a temperature sufficient to cause the elemental alkali metal to melt.

13. A process according to claim 11 wherein said elemental alkali metal is potassium.

14. A process according to claim 11 wherein said elemental alkali metal is present in the amount with the range from about 1 to about 20 weight percent based on the total weight of said catalyst support.

15. A process according to claim 11 further comprising contacting said catalyst system with at least one promoter selected from the group consisting of finely divided stainless steel, elemental copper, elemental cobalt, finely divided glass, and mixtures thereof.

16. A process according to claim 10 wherein said support comprises low surface area silica-alumina within the range of from about 1 to about 40 weight percent, based on total weight of the support.

17. A process in accordance with claim 10 wherein said particulate product is formed by:
a) drying said thick paste under conditions suitable to remove substantially all liquid from said paste to form a dried product;
b) crushing the dried product of step (a); and
c) collecting a substantially uniform particle size particulate product.

18. A catalyst system produced by a process of claim 11.

* * * * *